United States Patent Office 3,096,354
Patented July 2, 1963

3,096,354
2-FLUOROACETYL-5-ANDROSTENOLONE
COMPOUNDS
Marcel Harnik, Morristown, Tenn., assignor to Chemetron
Corporation, Chicago, Ill., a corporation of Delaware
No Drawing. Filed July 6, 1961, Ser. No. 122,093
8 Claims. (Cl. 260—397.5)

This invention relates to androstene compounds of the following general formula and to the production thereof:

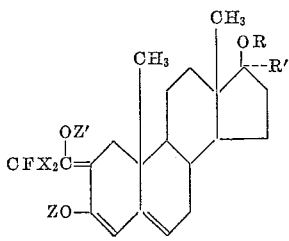

wherein X is hydrogen or fluorine; R is hydrogen or a lower alkanoyl radical; R' is hydrogen or a lower alkyl; Z is hydrogen or a lower alkanoyl radical; and Z' is hydrogen, an alkali metal or a lower alkanoyl radical.

The compounds of this invention have adrenocortical activity and are useful in the relief of inflammation of rheumatoid arthritis and similar collagen and allergic conditions. They have particular utility in inducing thymolytic corticoid activity in mammals and can be applied parenterally in aqueous suspensions or in innocuous organic solvents. They are thus useful in supplementing the cortical hormone production of mammals without the side effects of the progestational hormones. These compounds are also useful as intermediates in the synthesis of adrenocorticoid compounds.

In the compounds of the foregoing formula, R and Z can represent hydrogen or lower alkanoyl radicals such as formyl, acetyl, propionyl or butyryl radicals, and R' can represent hydrogen or lower alkyl radicals, such as methyl, ethyl, propyl, isopropyl or butyl radicals. Z' can represent hydrogen, an alkali metal such as sodium, potassium or lithium or a lower alkanoyl radical such as formyl, acetyl, propionyl or butyryl radicals.

It is an object of this invention to provide new androstene compounds which have useful physiological activity. It is a further object to provide efficient methods for producing such compounds from available steroids. Another object is to provide androstene compounds having fluorinated alkylidene radicals in the 2-position which are useful as adrenocorticoids. These and other objects are apparent from and are achieved in accordance with the following disclosure.

The compounds of this invention are produced from 4-androstene-17-ol-3-one or 4-androstene-17-methyl-17-ol-3-one. The first step is the condensation of 4-androstene-17-ol-3-one with an alkyl ester of trifluoroacetic acid, of difluoroacetic acid or of monofluoroacetic acid in the presence of an alkaline condensing agent such as an alkali metal hydride or an alkali metal alkoxide in an inert solvent. The condensation is preferably conducted in a nonoxidizing atmosphere at a temperature in the range of 50–150° C. By this procedure a trifluoroacetyl, difluoroacetyl or monofluoroacetyl radicals is introduced at the 2-position of 4-androstene-17-ol-3-one. The tri-, di- or monofluoroacetyl androstenolone forms a relatively stable enol of the general formula

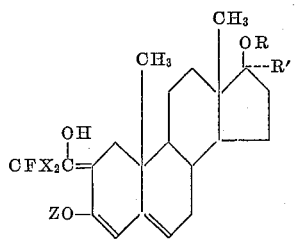

wherein X, R, R' and Z have the meanings given above, and it also forms salts with alkali metals by reaction with aqueous alkali (e.g., aqueous KOH, NaOH or LiOH), which salts are insoluble in organic solvents and relatively insoluble in water from which they precipitate on standing. Such alkali metal enol salts can be isolated and converted to enol esters by reaction with acyl anhydrides or chlorides, such as acetic anhydride or propionyl chloride. Enol esters can also be produced from 2-trifluoroacetylandrostene-17-ol-3-one, from 2-difluoroacetylandrostene-17-ol-3-one, or from 2-fluoroacetylandrostene-17-ol-3-one by reaction with isopropenyl alkanoates (e.g., isopropenyl acetate or butyrate) in the presence of an aromatic sulfonic acid (e.g., toluenesulfonic acid) or by reaction with alkanoic acid anhydride, preferably in the presence of a basic solvent such as pyridine, quinoline or dimethylaniline, to form an enol alkanoate from the β-diketone which is formed by the introduction of the substituted acetyl radical at the 2-position of the androstenolone.

In the general structural formulas of this application, the bonds attaching radicals to the 2-position cyclopentanopolyhydrophenanthrene nucleus are not intended to indicate stereochemical configuration and solid bonds at the 2-position are used in the general structural formulas to denote α,β and unknown configuration. Where used, the symbol Ac represents the acetyl radical.

The invention is disclosed in further detail by means of the following examples which are provided to illustrate the invention without limiting it thereto. It will be apparent to those skilled in the art that various modifications in reaction conditions, reagents and equivalent materials can be made without departing from the invention herein disclosed.

EXAMPLE 1

2-(2,2,2-Trifluoro-1-Hydroxylethylidene)-3,5-Androstadiene-3,17β-Diol Triacetate

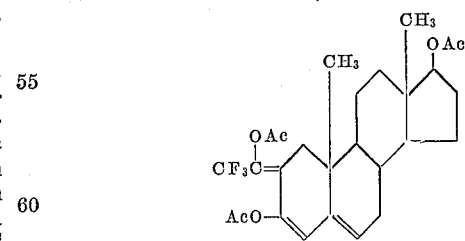

A mixture of 50 g. of testosterone, 625 ml. of dry benzene, 32.5 g. of sodium methoxide and 75 ml. of ethyl trifluoroacetate was gently refluxed with stirring for 1½ hours. A solid began to precipitate after about 40 minutes. The mixture was cooled in an ice bath, decomposed with 250 ml. of 5% hydrochloric acid, and stirred at 0° C. for 20 minutes. The benzene phase was washed twice with water and with saturated sodium chloride solution, dried and evaporated. The oily product [2-trifluoroacetyl-4-androstene-17β-ol-3-one] was dissolved in 300 ml. of ether and the solution was chilled with ice and agitated with 150 ml. of 10% potassium hydroxide solution. The potassium salt of the enol form of 2-trifluoroacetyl-4-androstene-17β-ol-3-one separated slowly. It was removed by filtration and dried in the air and then in a vacuum oven at 50 C. for 24 hours to afford 69 g. of the yellow salt in powder form. This salt was refluxed for 3 hours with 300 ml. of acetic anhydride and the mixture was evaporated under vacuum. The solid residue of 2-(2,2,2 - trifluoro-1-hydroxyethylidene)-3,5-androstadiene-3,17β-diol triacetate was triturated with 300 ml. of cold methanol and recrystallized from 300 ml. of ethyl acetate. A yield of 41.5 g. of product melting at 211.5–213.5° C. was obtained. The I.R. absorption spectrum (in KBr) showed peaks at 5.58, 5.64 and 5.75 microns, indicating the presence of 2,2,2-trifluoro-1-acetoxyethylidene and 17-acetoxy radicals. The U.V. absorption spectrum showed $\lambda_{max.}^{EtOH}$ 288 mμ (E=18,000), $\lambda_{min.}$ 220 mμ (E=4,400)

The optical rotation in chloroform was $[\alpha]_D^{25}$ —309°.

EXAMPLE 2

*2-(2,2,2-Trifluoro-1-Hydroxyethylidene)-4-Androstene-17β-Ol-3-One Diacetate*

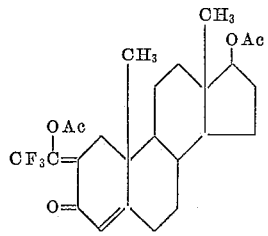

760 mg. of 2-trifluoroacetyl-4-androstene-17β-ol-3-one (Example 1) was refluxed 15 hours with 20 ml. of isopropenyl acetate and 71 mg. of p-toluene sulfonic acid monohydrate. The resulting solution was diluted with ether and washed with sodium bicarbonate solution, with water and with saturated sodium chloride solution. The solution was evaporated and the residue of 2-(2,2,2-trifluoro-1-hydroxyethylidene)-4-androstene-17β-ol-3-one diacetate was crystallized by trituration in cold methanol. After recrystallization from heptane this compound melted at 144.5–147° C. The I.R. absorption spectrum (in KBr) showed peaks at 5.60, 5.75, 6.00 and 6.07 microns, indicating the presence of the following radicals: 2,2,2-trifluoro - 1 - acetoxyethylidene, 17-acetoxy and 3-carbonyl with conjugated double bond. The U.V. absorption spectrum had maxima 267 and 340–342 millimicrons (E=30,100 and 2,800) and minima at 220 and 317 millimicrons (E=4,320 and 1,680). The optical rotation in chloroform was $[\alpha]_D^{25}$ +17°.

EXAMPLE 3

*2-Trifluoroacetyl-4-Androstene-17β-Ol-3-One Acetate*

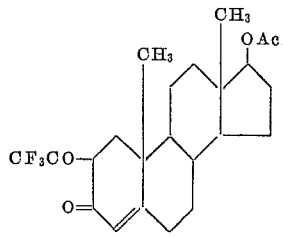

781 mg. of the potassium salt of 2-trifluoroacetyl-4-androstene-17β-ol-3-one (Example 1) was suspended in ether and cold 5% hydrochloric acid and the suspension was agitated until the solid dissolved. The ether phase was washed with water, with saturated sodium chloride solution, dried and evaporated. The residue of 2-trifluoroacetyl-4-androstene-17β-ol-3-one was refluxed for one-half hour with 10 ml. of acetic anhydride and the mixture then evaporated to dryness under reduced pressure. The yellow-orange gum which was obtained crystallized on trituration with methanol. After recrystallization from hexane there was obtained 875 mg. of 2-trifluoroacetyl-4-androstene-17β-ol-3-one acetate of M.P. 138–142° C. Further purification raised the M.P. to 141–142.5° C. The I.R. absorption spectrum (in KBr) showed peaks at 5.74, 6.13 and 6.25 microns indicating the presence of acetoxy and β-diketone groups. The U.V. absorption spectrum had maxima at 255–259, 310–315 and 360 millimicrons (E=7,600, 4,050 and 5,600) and minima at 220, 285 and 319 millimicrons (E=3,300, 2,850 and 3,960). The optical rotation in chloroform was $[\alpha]_D^{25}$ —8°.

EXAMPLE 4

*2-(2,2-Difluoro-1-Acetoxyethylidene)-4-Androstene-17β-Ol-3-One Acetate*

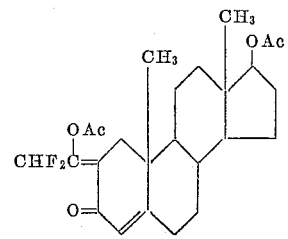

A mixture of 2 g. of testosterone, 4 g. of sodium methoxide, 15 ml. of dry benzene and 3 ml. of ethyl difluoroacetate was refluxed with stirring for 70 minutes. Then 1 ml. of ethyl difluoroacetate was added and refluxing continued for an hour. An oil separated during the reaction and had solidified at the end. The mixture was cooled in ice and decomposed with ice and 5% hydrochloric acid. The organic layer was separated, washed with water and with saturated sodium chloride solution, dried and evaporated, leaving a residue of 2-difluoroacetyl-4-androstene-17β-ol-3-one. This was dissolved in a mixture of 11 ml. of acetic anhydride and 11 ml. of pyridine and allowed to stand for 15 hours. Ice and water were then added and the precipitate dissolved in ether. The ether solution was washed with water, with dilute hydrochloric acid, with water, with sodium bicarbonate solution, with water, with saturated sodium chloride solution, dried and evaporated. The residue of 2-(2,2-difluoro-1-acetoxyethylidene - 4 - androstene-17β-ol - 3 - one crystallized on standing. After recrystallization from methanol it melted at 135–137° C. The I.R. absorption spectrum had peaks at 5.60, 5.72–5.75, 5.92 and 6.1 microns and the U.V. absorption spectrum had a maximum at 267 millimicrons (E=15,000). The optical rotation was $[\alpha]_D^{25}$ +67°.

EXAMPLE 5

*2-Trifluoroacetyl-17α-Methyl-4-Androstene-17β-Ol-3-One*

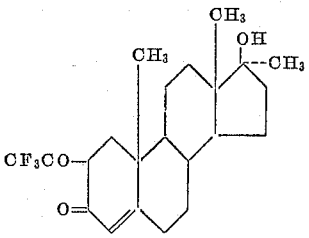

A mixture of 1.977 g. of 17α-methyltestosterone, 1.034 g. of 52% sodium hydride in oil, 50 ml. of dry benzene and 3.5 ml. of ethyl trifluoroacetate was heated with stirring under nitrogen. At around 70° C. a vigorous reaction set in. The heat was removed and replaced after the reaction subsided (about 7 minutes). After additional refluxing with stirring for 45 minutes the reaction mixture was cooled and decomposed by dropwise addition of methanol. Then 5% hydrochloric acid was added and the benzene layer was separated, washed with water, with saturated sodium chloride solution, dried and evaporated. The residue of 2-trifluoroacetyl-17α-methyl-4-androstene-17β-ol-3-one was dissolved in ether and extracted with 5% KOH solution. It formed a potassium salt (in contrast to 17α-methyltestosterone) which was soluble in water. On dilution of the aqueous solution with 500 ml. of water, the potassium salt of 2-trifluoroacetyl-17α-methyl-4-androstene-17β-ol-3-one precipitated as a yellow flaky solid. The precipitation was not complete. The salt was removed by filtration and washed with water and ether; it weighed 1.75 g. By acidification of the aqueous filtrate with cold hydrochloric acid, followed by extraction with ether and evaporation of the extract, 400 mg. of 2-trifluoroacetyl-17α-methyl-4-androstene-17β-ol-3-one was obtained.

EXAMPLE 6

*2-(2,2,2-Trifluoro - 1 - Hydroxyethylidene)-17α-Methyl-3,5-Androstadiene-3,17β-Diol Triacetate*

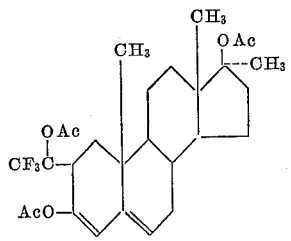

1.5 grams of the potassium salt of 2-trifluoroacetyl-17α-methyl-4-androstene-17β-ol-3-one and 15 ml. of acetic anhydride were refluxed for 30 minutes. The voltatile materials were removed in vacuo and the residue was triturated with methanol until crystilline. On recrystallization from ethyl acetate 400 mg. of 2-(2,2,2-trifluoro-1 - hydroxyethylidene) - 17α - methyl-3,5-androstadiene-3,17β-diol triacetate melting at 217–219° C. was obtained. The I.R. absorption spectrum (in KBr) had peaks at 5.65, 5.75 and 6.21 microns and the U.V. absorption spectrum had maxima at 288 and 290 millimicrons (E=21,800 and 21,000) and minima at 220–221 and 289 millimicrons (E=5,300 and 20,700).

What is claimed as new and desired to be secured by Letters Patent of the United States is:

1. An androstene compound of the formula

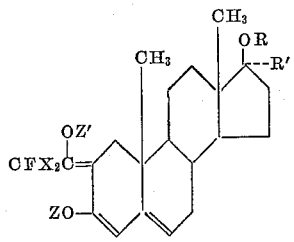

wherein X is a member of the group consisting of hydrogen and fluorine; R and Z are members of the group consisting of hydrogen and lower alkanoyl radicals; R' is a member of the group consisting of hydrogen and lower alkyl radicals; and Z' is a member of the group consisting of hydrogen, alkali metal and lower alkanoyl radicals.

2. A compound as defined by claim 1 wherein X is fluorine, R' is hydrogen, and Z, Z' and R are acetyl radicals.

3. A compound as defined by claim 1 wherein X is fluorine and R, R', Z and Z' are hydrogen.

4. A compound as defined by claim 1 wherein X is fluorine, Z' is potassium, and R, R' and Z are hydrogen.

5. A compound as defined by claim 1 wherein X is fluorine, R is an acetyl radical and R', Z and Z' are hydrogen.

6. A compound as defined by claim 1 wherein one X is fluorine and one X is hydrogen, R and Z' are acetyl radicals and R' and Z are hydrogen.

7. A compound as defined by claim 1 wherein X is fluorine, R' is methyl, and R, Z and Z' are hydrogen.

8. A compound as defined by claim 1 wherein X is fluorine, R' is methyl, and R, Z and Z' are acetyl radicals.

No references cited.